United States Patent
Buer et al.

(10) Patent No.: US 7,822,797 B2
(45) Date of Patent: Oct. 26, 2010

(54) SYSTEM AND METHOD FOR GENERATING INITIAL VECTORS

(75) Inventors: Mark L. Buer, Gilbert, AZ (US); Zheng Qi, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 698 days.

(21) Appl. No.: 10/207,329

(22) Filed: Jul. 29, 2002

(65) Prior Publication Data
US 2004/0019619 A1    Jan. 29, 2004

(51) Int. Cl.
G06F 7/38 (2006.01)
(52) U.S. Cl. ...................................................... 708/252
(58) Field of Classification Search .......... 708/250–256
See application file for complete search history.

(56) References Cited

U.S. PATENT DOCUMENTS

| | | | | |
|---|---|---|---|---|
| 4,839,841 A | * | 6/1989 | Hagen et al. ................. | 708/250 |
| 5,515,307 A | * | 5/1996 | Aiello et al. ................. | 708/254 |
| 5,570,307 A | * | 10/1996 | Takahashi ................... | 708/256 |
| 5,732,138 A | | 3/1998 | Noll et al. | |
| 5,757,923 A | * | 5/1998 | Koopman, Jr. ............... | 708/250 |
| 5,778,069 A | * | 7/1998 | Thomlinson et al. ........ | 708/250 |
| 5,963,104 A | * | 10/1999 | Buer ........................... | 708/250 |
| 6,003,117 A | | 12/1999 | Buer et al. | |
| 6,101,605 A | | 8/2000 | Buer | |
| 6,111,877 A | * | 8/2000 | Wilford et al. .............. | 370/238 |
| 6,192,385 B1 | * | 2/2001 | Shimada ..................... | 708/250 |
| 6,260,132 B1 | | 7/2001 | Buer | |
| 6,594,680 B1 | * | 7/2003 | Gu et al. ..................... | 708/256 |
| 6,816,876 B2 | * | 11/2004 | Jha et al. ..................... | 708/252 |
| 2002/0016805 A1 | * | 2/2002 | Smeets ....................... | 708/251 |
| 2002/0174152 A1 | * | 11/2002 | Terasawa et al. ............ | 708/250 |
| 2003/0204541 A1 | * | 10/2003 | Shackleford et al. ........ | 708/250 |

FOREIGN PATENT DOCUMENTS

WO    WO 01/39417 A2    5/2001

OTHER PUBLICATIONS

Search Report for European Application No. EP 03 01 7104.5 mailed Jun. 21, 2006, 3 pgs.
Examination for European Application No. EP 03 01 7104.5 mailed Feb. 19, 2007, 4 pgs.
Examination for European Application No. EP 03 01 7104.5 mailed Jan. 24, 2008, 3 pgs.
Lo et al., "Stream Ciphers for GSM Networks", Computer Communications, Elsevier Science Publishers BV, Amsterdam, NL, vol. 24, No. 11, Jun. 15, 2001, pp. 1090-1096, XP004247045, ISSN: 0140-3664.

* cited by examiner

Primary Examiner—Chat C Do
(74) Attorney, Agent, or Firm—Sterne, Kessler, Goldstein & Fox P.L.L.C.

(57) ABSTRACT

Methods and systems are disclosed for generating random numbers and initial vectors. A random number generator generates one or more random numbers that are used to repetitively seed pseudo random number generators so that the pseudo random number generators generate random numbers. Thus, a single random number generator may be used to simultaneously generate several random numbers. The random numbers generated by the pseudo random number generators may be used as initial vectors in encryption engines.

11 Claims, 5 Drawing Sheets

SYSTEM AND METHOD FOR GENERATING INITIAL VECTORS

FIELD OF THE INVENTION

The invention relates generally to the field of cryptography and, more particularly, to systems and methods for generating random numbers and initial vectors.

BACKGROUND OF THE INVENTION

Cryptography involves encoding and decoding information so that only authorized persons can access the information. For example, a data file that contains sensitive financial information may need to be encrypted to prevent unauthorized persons from accessing the financial information. The data file may be encrypted before it is stored in a data storage device and/or before it is transmitted over a data network.

Typically, data is encrypted using a cipher algorithm and an encryption key. In addition, some cipher algorithms combine data to be encrypted with an initial vector to increase the randomness of the encrypted data. Data encrypted in this way is then decrypted using the cipher algorithm, a decryption key and the initial vector.

Several cipher algorithms have been developed for encrypting and decrypting data. Common cryptography standards include Data Encryption Standard ("DES"), triple DES ("3DES") and Advanced Encryption Standard ("AES").

Several standards have been developed to secure data transmission over data networks. For example, the Internet Security Protocol (commonly referred to as "IPsec") may be used to establish secure host-to-host pipes and virtual private networks over the Internet. IPsec defines a set of specifications for cryptographic encryption and authentication.

In general, cipher algorithms are relatively complex and upon execution consume a significant amount of processing power. To offload encryption/decryption processing from a host processor, dedicated hardware devices, commonly referred to as cryptographic accelerators, may be used to perform the cipher algorithms.

Moreover, some cryptographic standards such as IPsec encourage or require that the initial vectors be true random numbers. In practice, some systems that support IPsec operate at very high data rates (e.g., data transfer rates on the order of 1 gigabit per second). However, it may be difficult to generate random numbers quickly enough to support these high data rates. Some conventional systems attempt to generate random numbers at higher rates by using faster sampling rates. However, this approach may adversely affect the randomness of the generated number. Accordingly, a need exists for improved initial vector generation techniques.

SUMMARY OF THE INVENTION

The invention relates to methods and associated systems for generating random numbers and initial vectors.

One embodiment of the invention uses pseudo random number generators to generate random numbers. A random number generator generates random numbers that are used to repetitively seed the pseudo random number generators. This technique improves the number distribution of the pseudo random number generators so that each of the pseudo random number generators generates a random number. Thus, a single random number generator may be used to simultaneously generate several random numbers. Significantly, this is accomplished without compromising the randomness of the random numbers generated by the random number generator.

In one embodiment of the invention the random numbers generated by the pseudo random number generators are used as initial vectors in encryption engines.

In one embodiment of the invention the pseudo random number generators comprise linear feedback shift registers.

One embodiment of the invention comprises a random bit generator and a round robin distribution circuit for distributing random bits to the pseudo random number generators.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
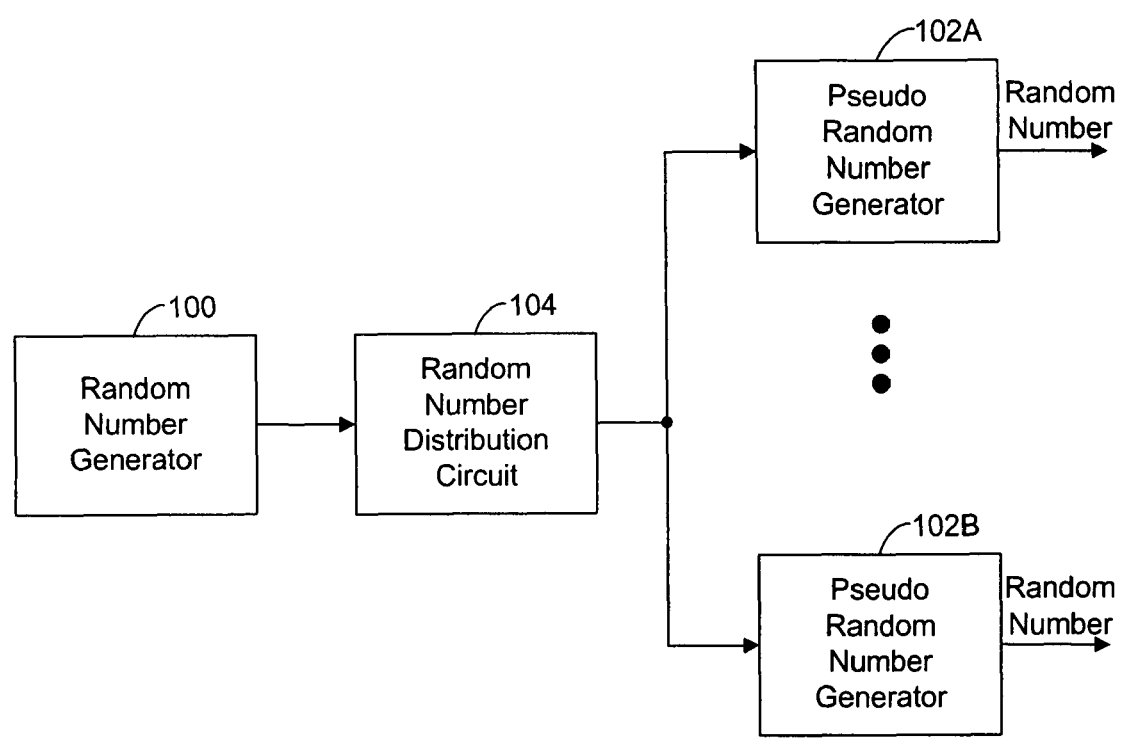
FIG. 1 is a block diagram of one embodiment of a random number generator constructed in accordance with the invention.

FIG. 1 is a block diagram of one embodiment of a parallel random number generator R constructed in accordance with the invention. A random number generator 100 generates random numbers that seed several pseudo random number generators (e.g., 102A and 102B) which, in turn, may generate random numbers in parallel. As represented by the random number distribution circuit 104, the random number may be distributed to the pseudo random number generators 102A and 102B in a variety of ways.

The pseudo random number generators 102A and 102B include inputs for seeding the computation of the pseudo random numbers. For example, a simple pseudo random number generator may have a number generation algorithm of $x(n+1)=x(n)^4+x(n)+1$. Thus, in normal operation the next output ($x(n+1)$) of the pseudo random number generator is based on the current output ($x(n)$). When the pseudo random number generator is re-seeded, however, the seed is used to generate the next output. For example, $x(n+1)=seed^4+seed+1$. In other words, as a random number is received by each pseudo random number generator 102A and 102B, the pseudo random number computation is affected by the random number.

In one embodiment of the invention the random number generator 100 continuously generates random numbers. Thus, the pseudo random number generators 102A and 102B may be continuously re-seeded. In particular, the pseudo random number generators 102A and 102B may be re-seeded before their number generation algorithms repeat (i.e., before the generators generate a number a second time).

Typically, the pseudo random number generators 102A and 102B are free running. That is, they continuously generate random numbers. Significantly, by generating random numbers using as many parallel pseudo random number generators as is needed for a particular application, this aspect of the invention provides a mechanism for generating a relatively large number of random numbers at a relatively high rate of speed.

As discussed in more detail below, this technique is particularly advantageous when used to generate initial vectors for encryption algorithms.

Figure 2:
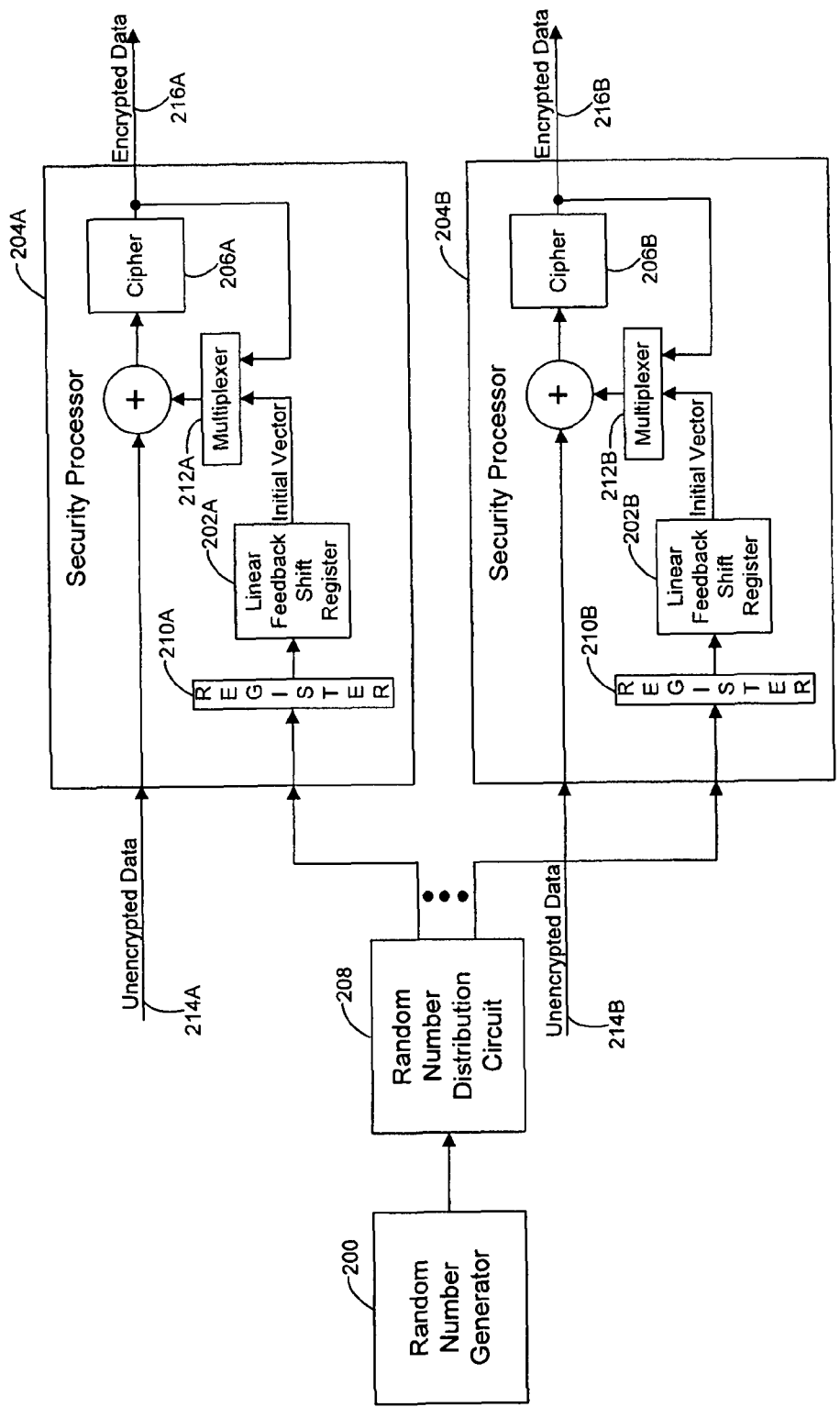
FIG. 2 is a block diagram of one embodiment of a cryptographic system constructed in accordance with the invention.

FIG. 2 is a block diagram of one embodiment of a cryptographic system S constructed in accordance with the invention. A random number generator 200 generates random numbers that seed linear feedback shift registers 202A and 202B in several security processors 204A and 204B. The linear feedback shift registers 202A and 202B generate initial vectors (e.g., random numbers) for cipher engines (partially represented by ciphers 206A, 206B and multiplexers 212A, 212B) in the security processors 204A and 204B. Thus, in this embodiment pseudo random number generators are implemented as linear feedback shift registers 202A and 202B. A random number distribution circuit 208 distributes the random numbers to the security processors 204A and 204B.

Figure 3:
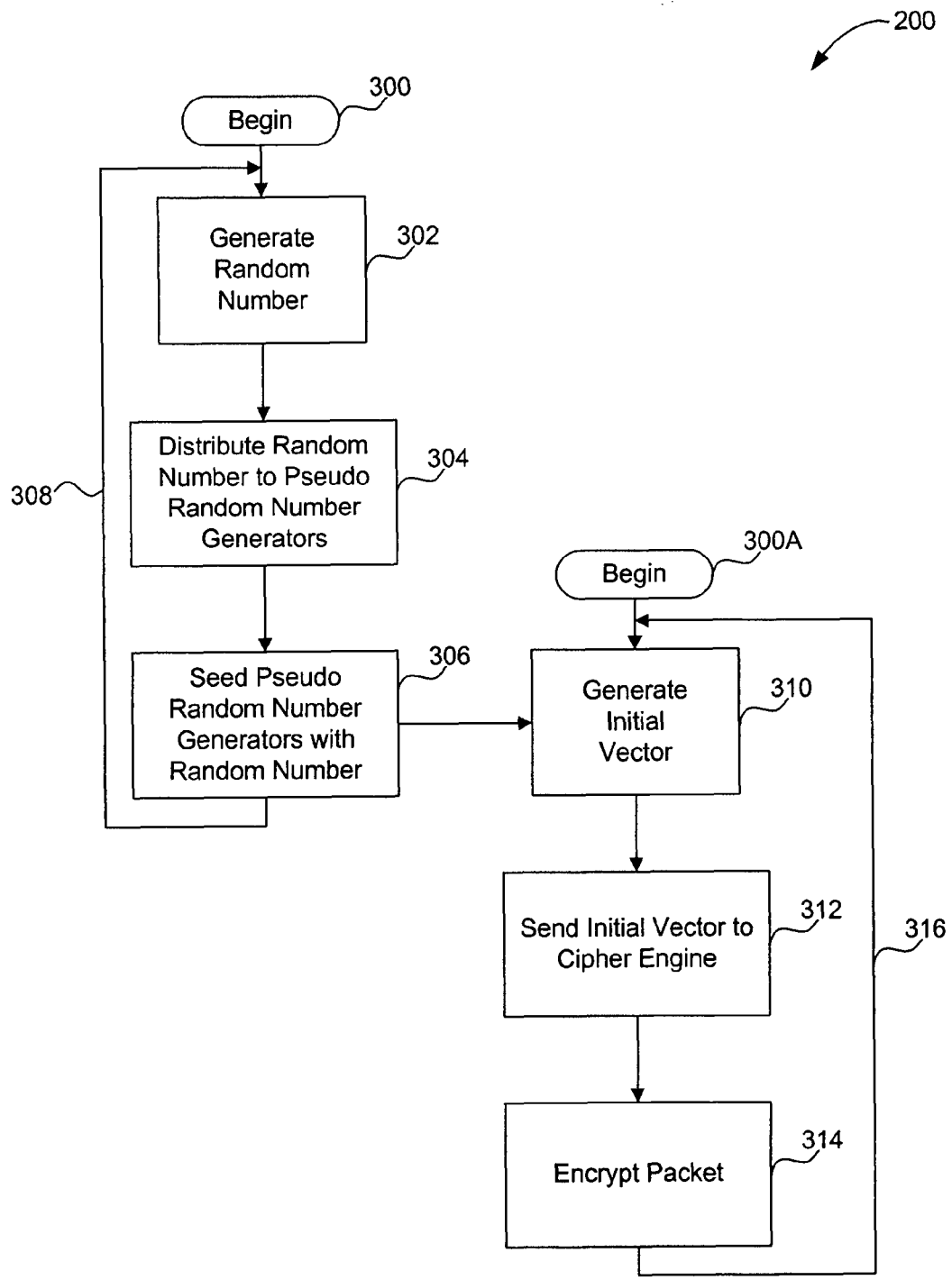
FIG. 3 is a flowchart representative of one embodiment of operations that may be performed in accordance with the embodiment of FIG. 2.

The operation of the system S of FIG. 2 will be treated in more detail in conjunction with the flowchart depicted in FIG. 3. The blocks and lines 302 through 308 beginning at block 300 represent the process of continuously seeding the linear feedback shift registers 202A and 202B with random numbers. The blocks and lines 310 through 316 beginning at block 300A represent the process of continuously encrypting packets using unique initial vectors generated for each packet.

As represented by block 302, the random number generator 200 continuously generates random numbers. The random number generator 200 is a true random number generator. For example, it may be implemented in an integrated circuit and generate numbers based on noise signals.

As represented by block 304, the random number distribution circuit 208 distributes the random number to pseudo random number generators (e.g., the linear feedback shift registers 202A and 202B).

In one embodiment of the invention, the random number generator 200 generates a stream of random data bits. In this case, the random number distribution circuit 208 may distribute these data bits in a round robin manner to the security processors 204A and 204B. For example, in one embodiment the random number distribution circuit 208 alternately routes each random data bit to one of the registers 210A, 210B in the security processors 204A, 204B. The registers then, in effect, assemble the bits into an appropriate word width to seed the linear feedback shift registers 202A, 202B.

Figure 4:
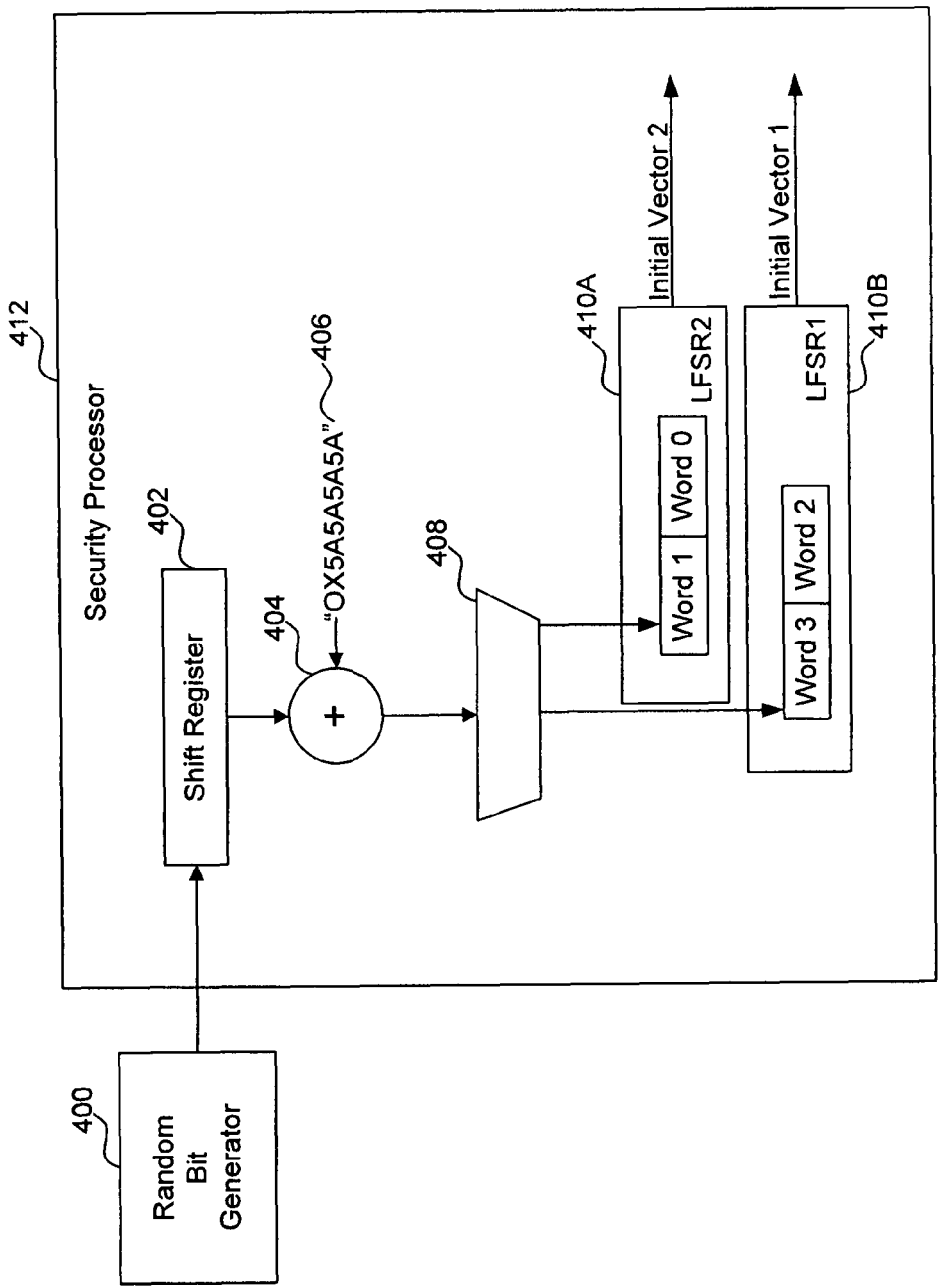
FIG. 4 is a block diagram of one embodiment of an initial vector generator constructed in accordance with the invention.

An example of this embodiment is depicted in FIG. 4. FIG. 4 depicts a system including a security processor 412 that incorporates two free running 64 bit linear feedback shift registers to generate 128 bits of data required for AES-CBC encryption.

In FIG. 4 a random bit generator 400 distributes some of the random data bits to a 32 bit shift register 402 in the security processor 412. For example, each of eight security processors (not shown) may receive one bit for every eight bits generated by the random bit generator 400. An adder 404 adds the 32 bit random number output of the shift register 402 to a 32 bit word (0x5A5A5A5A) 406 to reduce the probability that the input to the linear feedback shift registers will be zero.

A multiplexer 408 distributes the data bits from the 32 bit random number to the seed inputs of linear feedback shift registers 410A and 410B. In this embodiment, the multiplexer 408 is used to re-seed the most significant word of each of the 64 bit linear feedback shift registers in a round robin fashion each time 32 bits of data are detected in the shift register 402.

The width of the initial vector may depend on the type of encryption. For example, in a block cipher the width of the initial vector may equal the width of a block. In one embodiment, when DES encryption is activated the initial vector is 64 bits and, alternatively, when AES is activated the initial vector is 128 bits. Thus, for 3DES and DES the initial vector may be constructed using WORD2 and WORD0 from the two 64 bit linear feedback shift registers 410A and 410B. For AES the initial vector may be constructed using WORD3, WORD2, WORD1 and WORD0 from the two 64 bit linear feedback shift registers 410A and 410B.

This implementation of a random number generator helps to ensure that the initial vectors are picked at random as often as possible for each packet. In addition, this implementation of free running linear feedback shift registers helps to ensure that back to back packets have initial vectors with a relatively high Hamming distance as recommended for IPsec.

This embodiment may be used to support encryption at relatively high data rates. For example, one embodiment of the invention uses a random bit generator operating at 2 million bits per second ("2 Mbits/s") in conjunction with eight security processors, each of which provides cryptographic processing at 600 Mbits/s. In this case, using 64 bit linear feedback shift registers the linear feedback shift registers are re-seeded every 256 random bits. It should be noted, however, that the linear feedback shift registers typically are "clocked" every clock cycle (e.g., at a 600 Mbit/s rate).

To ensure that the pseudo random number generators do not repeat before they are re-seeded, it is important to select proper polynomials for the pseudo random number generators. For example, for a 64 bit linear feedback shift register, a polynomial on the order of $2^{64}$ typically may be used. In one embodiment, the polynomial for the first linear feedback shift register is $x^{64}+x^4+x^3+x+1$ and the polynomial for the second linear feedback shift register is $x^{65}+x^{18}+1$.

Referring again to the process in FIG. 3, as represented by block 306, the random numbers in the registers 210A and 210B (FIG. 2) are used to seed the linear feedback shift registers 202A and 202B.

The linear feedback shift registers 202A and 202B generate initial vectors (block 310) that are used by cipher engines to encrypt data (block 312). For example, when a new packet is to be encrypted, a multiplexer 212A adds the initial vector to unencrypted data received over line 214A. A cipher 206A (e.g., a block cipher) encrypts a portion of the data and outputs it over line 216A (block 314). In addition, the encrypted data is fed back to the multiplexer 212A so it may be subsequently added to the unencrypted data in place of the initial vector.

As represented by the line 316, this operation repeats as necessary to encrypt the incoming data stream. In this embodiment, as each new packet is to be encrypted, a new initial vector is added to the data to improve the randomness of the encrypted data. To this end, the linear feedback shift registers 202A and 202B continuously generate new initial vectors.

To maintain the randomness of the initial vectors, as represented by the line 308, the linear feedback shift registers 202A and 202B are continuously re-seeded with random numbers. In particular, in accordance with one embodiment of the invention, the linear feedback shift registers are re-seeded on a per-packet basis.

In one embodiment, all of the components in the system S of FIG. 2 are implemented in a cryptographic accelerator integrated circuit. For example, the cryptographic accelerator may incorporate four, eight or more security processors. Such a device may be used, for example, to offload cryptographic computations from a host processor as depicted in FIG. 5.

Figure 5:
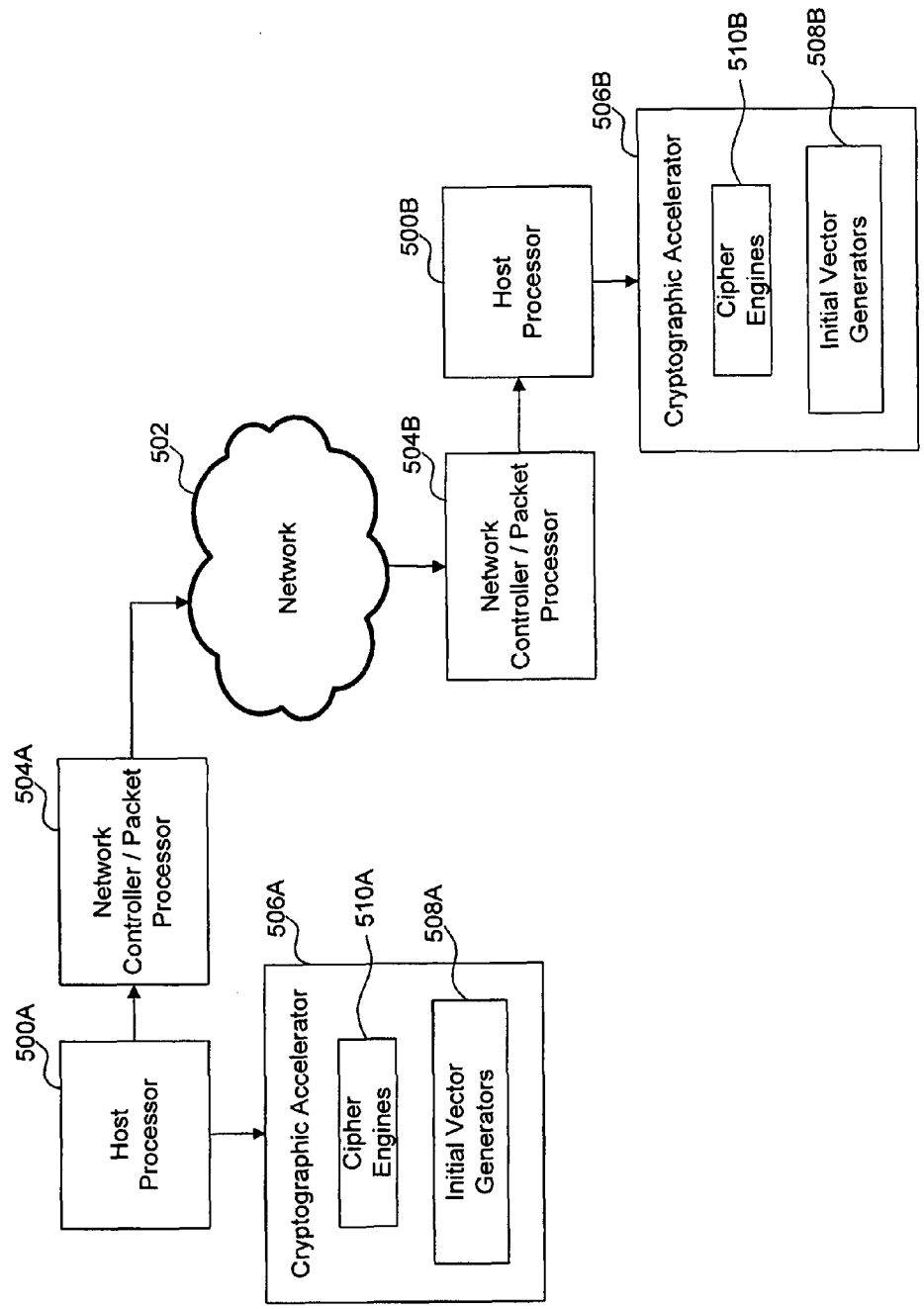
FIG. 5 is a block diagram of one embodiment of a cryptographic system in a packet data network, constructed in accordance with the invention.

In FIG. 5, host processors 500A and 500B connected to a data network 502 send messages to one another via network controller/packet processor components 504A and 504B. When one host processor sends secured data (e.g., per the IPsec standard) to the other host processor they may use cryptographic accelerators 506A and 506B to encrypt and decrypt the associated data packets. For example, a host processor (e.g., 500A) initially sends unencrypted packets to a cryptographic accelerator (e.g., 506A). The cryptographic accelerator includes cipher engines (e.g., 510A) that encrypt the packets. The cryptographic accelerator 506A may then send the encrypted packets over the network 502 or it may send the encrypted packets back to the host processor 500A and the host processor sends the encrypted packets over the network 502. In accordance with one embodiment of the invention, the cryptographic accelerators 506A and 506B may incorporate initial vector generators 508A and 508B as discussed herein.

It should be appreciated that the inventions described herein are applicable to and may utilize many different protocols and standards and modifications and extensions of those protocols and standards including, for example and without limitation, IPsec, SSL and FCsec. Moreover, a variety of cryptographic algorithms and modifications and extensions thereof may be used including, for example and without limitation, DES, 3DES and AES.

A variety of pseudo random number generators and associated algorithms may be used in implementing the inventions described herein. For example, different linear feedback algorithms and cyclic redundancy check ("CRC") algorithms may be used. In addition, the pseudo random number generators may be implemented using hashing techniques such as SHA-1 and MD5.

The pseudo random number generators may be seeded in several different ways. For example, the pseudo random number generators may be free running, i.e., they are continuously clocked. Alternatively, the pseudo random number generators may be clocked every time a new packet arrives.

It should also be appreciated that the inventions described herein may be constructed using a variety of physical components and configurations. For example, a variety of hardware and software processing components may be used to implement the functions and components described herein. These functions and components may be combined on one or more integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet).

A wide variety of devices may be used to implement the data memories discussed herein. For example, a data memory may comprise one or more RAM, disk drive, SDRAM, FLASH or other types of data storage devices.

The invention may be practiced using different types of cipher engines. For example, a stream cipher may be used rather than a block cipher.

Distribution of random numbers to the pseudo random number generators may be accomplished in a variety of ways. For example, the numbers may be distributed a bit at a time or a word at a time. Here, different word widths may be used depending on the particular application.

The random numbers also may be distributed using a variety of hardware and software techniques. For example, relatively simple signal lines and/or busses and/or associated registers may be used to distribute the random numbers. In addition, packet routing techniques may be used to route the random numbers and/or bits between various components in a system or an integrated circuit.

In summary, the invention described herein teaches improved techniques for generating random numbers and initial vectors. While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of generating a plurality of true output random numbers for use by a cryptographic process, comprising:
   generating true random bits using a true random number generator;
   continually seeding a plurality of registers in a security processor with the bits by distributing in a round robin manner, using a random number distribution circuit, each bit generated by the true random number generator to the registers, wherein the registers assemble the bits into an appropriate word width to seed a plurality of linear feedback shift registers, and wherein each linear feedback shift register is re-seeded prior to repeating; and
   generating the plurality of true output random numbers using the linear feedback shift registers.

2. The method of claim 1, wherein the true random number generator is constructed as an integrated circuit and is configured to generate the true seed random numbers based on a noise signal.

3. The method of claim 1, wherein a multiplexer is used to distribute the bits to the linear feedback shift registers.

4. A parallel random number generator constructed and arranged to generate a plurality of true output random numbers for use in a cryptographic device, comprising:
   a true random number generator configured to generate true random bits;
   a distribution circuit connected to the true random number generator, configured to distribute the bits in a round robin manner; and
   a plurality of registers in a security processor, configured to:
      continually receive each bit, and
      assemble, at each register, the bits into an appropriate word width to seed a plurality of linear feedback shift registers configured to generate the plurality of true output random numbers, wherein each linear feedback shift register is configured to re-seed prior to repeating.

5. An initial vector generator constructed and arranged to provide initial vectors to a cryptographic device, comprising:
- a true random number generator configured to generate true random bits;
- a distribution circuit, connected to the true random number generator, configured to distribute the bits in a round robin manner; and
- a plurality of registers in a security processor, configured to:
  - continually receive each bit, and
  - assemble, at each register, the bits into an appropriate word width to seed a plurality of linear feedback shift registers configured to generate the initial vectors, wherein each linear feedback shift register is configured to re-seed prior to repeating.

6. A method of generating initial vectors for use by a cryptographic device, comprising:
- continually distributing each of a plurality of random data bits generated by a true random number generator in a round robin manner to a plurality of registers in a security processor, using a random number distribution circuit, wherein the registers assemble the bits into an appropriate word width to seed a plurality of linear feedback shift registers, and wherein each linear feedback shift register is re-seeded prior to repeating; and
- generating a plurality of initial vectors using the linear feedback shift registers.

7. An initial vector generator constructed and arranged to provide initial vectors to a cryptographic device, comprising:
- a true random bit generator configured to generate a plurality of true random bits;
- a random number distribution circuit, connected to the true random bit generator, configured to distribute the plurality of the true random bits in a round robin manner; and
- a plurality of registers, configured to:
  - continually receive each true random bit, and
  - assemble, at each register, the bits into an appropriate word width to seed a plurality of linear feedback shift registers, the plurality of linear feedback shift registers being configured to generate a plurality of initial vectors, and each linear feedback shift register being configured to re-seed prior to repeating.

8. An initial vector generator constructed and arranged to provide initial vectors to a cryptographic device, comprising:
- a true random number generator configured to generate true random numbers comprising a plurality of true random bits;
- a random number distribution circuit, connected to the true random number generator, configured to distribute the true random bits in a round robin manner; and
- a plurality of registers, configured to:
  - continually receive each true random bit, and
  - assemble, at each register, the bits into an appropriate word width to seed a plurality of linear feedback shift registers, the plurality of linear feedback shift registers being configured to generate a plurality of initial vectors, and each linear feedback shift register being configured to re-seed prior to repeating.

9. A cryptographic accelerator, comprising:
- a true random number generator for generating true random bits;
- a random number distribution circuit, connected to the true random number generator for distributing the true random bits in a round robin manner;
- a plurality of registers in a security processor, configured to:
  - continually receive each bit, and
  - assemble, at each register, the bits into an appropriate word width to seed a plurality of linear feedback shift registers configured to generate initial vectors, wherein each linear feedback shift register is configured to re-seed prior to repeating; and
- at least one cipher engine, configured to:
  - receive the initial vectors, and
  - encrypt data using the initial vectors.

10. The method of claim 9, wherein the data comprises a plurality of packets.

11. The method of claim 10, wherein, as each of the packets is to be encrypted, a new initial vector is sent to the cipher engine.

* * * * *